United States Patent
Nagara et al.

(10) Patent No.: US 11,909,755 B2
(45) Date of Patent: *Feb. 20, 2024

(54) LOG TRANSMISSION CONTROLLER

(71) Applicant: DENSO CORPORATION, Kariya (JP)

(72) Inventors: Keigo Nagara, Kariya (JP); Taiji Abe, Kariya (JP)

(73) Assignee: DENSO CORPORATION, Kariya (JP)

( * ) Notice: Subject to any disclaimer, the term of this patent is extended or adjusted under 35 U.S.C. 154(b) by 113 days.

This patent is subject to a terminal disclaimer.

(21) Appl. No.: 17/368,999

(22) Filed: Jul. 7, 2021

(65) Prior Publication Data
US 2022/0014544 A1  Jan. 13, 2022

(30) Foreign Application Priority Data
Jul. 13, 2020  (JP) ................................. 2020-120229

(51) Int. Cl.
*G06F 15/16* (2006.01)
*H04L 9/40* (2022.01)
(Continued)

(52) U.S. Cl.
CPC ........ *H04L 63/1433* (2013.01); *H04L 51/226* (2022.05); *H04L 63/123* (2013.01); *H04L 63/1425* (2013.01); *H04L 67/12* (2013.01)

(58) Field of Classification Search
CPC . H04L 63/1433; H04L 51/226; H04L 63/123; H04L 63/1425; H04L 67/12
(Continued)

(56) References Cited

U.S. PATENT DOCUMENTS

| 11,474,889 B2 * | 10/2022 | Nagara | ................. G06F 11/079 |
| 2019/0182275 A1 * | 6/2019 | Ando | ................. G06F 11/3476 |

(Continued)

FOREIGN PATENT DOCUMENTS

| JP | 2018-010441 A | 1/2018 |
| JP | 2018-32254 A | 3/2018 |

(Continued)

OTHER PUBLICATIONS

U.S. Appl. No. 17/371,163, filed Jul. 9, 2021, Ishida et al.
(Continued)

*Primary Examiner* — Imad Hussain
(74) *Attorney, Agent, or Firm* — Harness, Dickey & Pierce, P.L.C.

(57) ABSTRACT

A log transmission controller includes a log acquirer, a priority storage, an update instruction acquirer, a priority updater and a transmitter. The log acquirer acquires a log indicating respective states of electronic control units connected to the log transmission controller equipped in a moving object. The priority storage stores priority information indicating a priority for transmitting the log to a server. The update instruction acquirer acquires a first update instruction generated by an update instructor for updating the priority information, and second and third update instructions generated by the server for updating the priority information. The priority updater updates the priority information based on the update instruction. The transmitter transmits the log based on the priority. The first and second update instructions are for updating the priority to be higher than a predetermined priority, and the third update instruction is for updating the priority to the predetermined priority.

16 Claims, 10 Drawing Sheets

(51) Int. Cl.
*H04L 67/12* (2022.01)
*H04L 51/226* (2022.01)

(58) Field of Classification Search
USPC .......................................................... 709/240
See application file for complete search history.

(56) References Cited

U.S. PATENT DOCUMENTS

| | | | |
|---|---|---|---|
| 2019/0306187 A1 | 10/2019 | Dyakin et al. | |
| 2020/0059813 A1* | 2/2020 | Park | H04W 4/46 |
| 2021/0258339 A1 | 8/2021 | Dyakin et al. | |
| 2021/0368007 A1 | 11/2021 | Hasegawa et al. | |
| 2021/0397504 A1* | 12/2021 | Nagara | G06F 11/0739 |
| 2022/0254198 A1* | 8/2022 | Hirano | H04L 43/04 |

FOREIGN PATENT DOCUMENTS

| | | |
|---|---|---|
| JP | 2019-194831 A | 11/2019 |
| WO | WO-2020/075826 A1 | 4/2020 |

OTHER PUBLICATIONS

U.S. Appl. No. 17/371,146, filed Jul. 9, 2021, Imoto et al.
U.S. Appl. No. 17/371,148, filed Jul. 9, 2021, Nagara et al.
U.S. Appl. No. 17/346,314, filed Jun. 14, 2021, Nagara et al.

\* cited by examiner

FIG. 4A

| NEWEST PRIO | DEF PRIO | LOG TYPE | VALIDITY PER |
|---|---|---|---|
| 15 | 15 | VER INFO LOG OF ECU-A | — |
| 12 | 12 | CFI LOG OF ECU-A | — |
| 15 | 15 | VER INFO LOG OF ECU-B | — |
| 12 | 12 | CFI LOG OF ECU-B | — |
| 10 | 10 | DATA OF CAN COMMUNICATION BUS | — |

FIG. 4B

| NEWEST PRIO | DEF PRIO | LOG TYPE | VALIDITY PER |
|---|---|---|---|
| 2 | 15 | VER INFO LOG OF ECU-A | 20XX/Y/Z 00:00:00 |
| 3 | 12 | CFI LOG OF ECU-A | 20XX/Y/Z 00:00:00 |
| 2 | 15 | VER INFO LOG OF ECU-B | 20XX/Y/Z 00:00:00 |
| 5 | 12 | CFI LOG OF ECU-B | 20XX/Y/Z 00:00:00 |
| 4 | 10 | DATA OF CAN COMMUNICATION BUS | 20XX/Y/Z 00:00:00 |

| FAULT CONT | LOG TYPE | PRIO UPD VAL | VALID PER |
|---|---|---|---|
| CFI FAULT OF ECU-A | VER INFO LOG OF ECU-A | 2 | 20XX/Y/Z 00:00:00 |
| | CFI LOG OF ECU-A | 2 | 20XX/Y/Z 00:00:00 |
| | VER INFO LOG OF ECU-B | 2 | 20XX/Y/Z 00:00:00 |
| | CFI LOG OF ECU-B | 5 | 20XX/Y/Z 00:00:00 |
| | DATA OF CAN COMM BUS | 4 | 20XX/Y/Z 00:00:00 |
| LOG FAULT OF CAN COMM | CFI LOG OF ECU-A | 3 | 20XX/Y/Z 00:00:00 |
| | DATA OF CAN COMM BUS | 1 | 20XX/Y/Z 00:00:00 |

FIG. 10A

| NEWEST PRIO | DEF PRIO | LOG TYPE | INSTR | PROP OF UPD | VALID PERD |
|---|---|---|---|---|---|
| 15 | 15 | VER INFO LOG OF ECU-A | — | — | — |
| 12 | 12 | CFI LOG OF ECU-A | — | — | — |
| 15 | 15 | VER INFO LOG OF ECU-B | — | — | — |

FIG. 10B

| NEWEST PRIO | DEF PRIO | LOG TYPE | INSTR | PROP OF UPD | VALID PERD |
|---|---|---|---|---|---|
| 3 | 15 | VER INFO LOG OF ECU-A | UPD_INSTR DEV | — | 20XX/Y/Z 00:00:00 |
| 3 | 12 | CFI LOG OF ECU-A | UPD_INSTR DEV | — | 20XX/Y/Z 00:00:00 |
| 2 | 15 | VER INFO LOG OF ECU-B | UPD_INSTR DEV | — | 20XX/Y/Z 00:00:00 |

FIG. 10C

| NEWEST PRIO | DEF PRIO | LOG TYPE | INSTR | PROP OF UPD | VALID PERD |
|---|---|---|---|---|---|
| 2 | 15 | VER INFO LOG OF ECU-A | SERV | PERMITTED | 20YY/Z/Z 00:00:00 |
| 1 | 12 | CFI LOG OF ECU-A | SERV | NOT PERMITTED | 20YY/Z/Z 00:00:00 |
| 2 | 15 | VER INFO LOG OF ECU-B | UPD_INSTR DEV | — | 20XX/Y/Z 00:00:00 |

LOG TRANSMISSION CONTROLLER

CROSS REFERENCE TO RELATED APPLICATION

This application is based on Japanese Patent Application No. 2020-120229 filed on Jul. 13, 2020, the disclosure of which is incorporated herein by reference.

TECHNICAL FIELD

The present disclosure relates to a log collection system, a log transmission controller, a log transmission control method and a computer program product for controlling the transmission of a log to a server.

BACKGROUND

It has been known that technologies for driving support and automated driving control, including V2X such as vehicle-to-vehicle communication and road-to-vehicle communication, have been drawing attention. Therefore, vehicles may be equipped with a communication function so that the vehicles are becoming more connected. However, the vehicles equipped with the communication function may be increasingly vulnerable to a cyber-attack.

SUMMARY

The present disclosure describes a log collection system, a log transmission controller, a log transmission control method and a computer program product for updating priority information based on an update instruction and transmitting a log to a server based on the updated priority information.

BRIEF DESCRIPTION OF THE DRAWINGS

The objects, features and advantages of the present disclosure will become more apparent from the following detailed description made with reference to the accompanying drawings. In the drawings:

FIG. 4A illustrates information stored in a priority storage according to the first embodiment;

FIG. 4B illustrates information stored in a priority storage according to the first embodiment;

FIG. 10A illustrates information stored in a priority storage according to the second embodiment;

FIG. 10B illustrates information stored in the priority storage according to the second embodiment;

FIG. 10C illustrates information stored in the priority storage according to the second embodiment.

DETAILED DESCRIPTION

Figure 1:
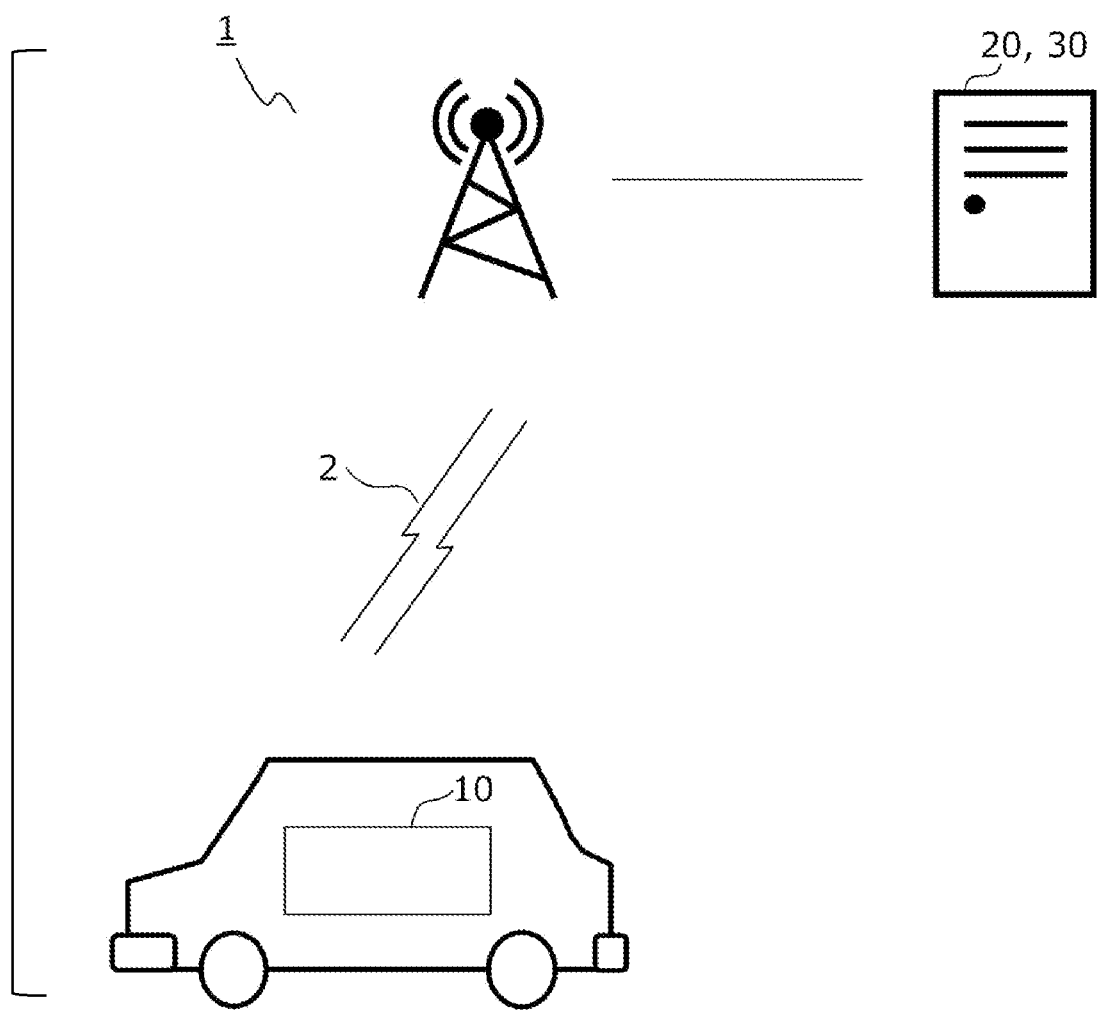
FIG. 1 is a block diagram that illustrates an example of the configuration of a log collection system commonly adopted in each of embodiments.

In a situation where a cyber-attack on vehicles occurs, the cyber-attack may hinder the control of the vehicle through the attack. Therefore, it is important that an analysis on the cyber-attack is needed for prevention in advance, countermeasure on the cyber-attack or restoration from the cyber-attack. Therefore, a server device having abundant resources may collect and analyze logs of an in-vehicle device. However, it may not be desirable to transmit all the large amount of logs generated by the in-vehicle device to the server device, in view of lack of resources of the in-vehicle device or network load.

For example, in a situation where the server device analyzes log received from the in-vehicle device and detects possibility of the cyber-attack, the server device may transmit to the in-vehicle device an update instruction for modifying the priority of the log stored in the in-vehicle device. In a situation where the in-vehicle device receives the update instruction for modifying the priority to raise the priority of the log used for determining the cyber-attacks, the in-vehicle device stores the log according to the priority and transmits the log to the server device. As a result, the server device may collect the log for determining the cyber-attacks while utilizing limited resources.

The inventors in the present application had found the following difficulty. In a situation where the in-vehicle device updates the priority of the log based on the instruction from the server device, it takes some time for the server device to execute log analysis, and it also takes some time for the server device to transmit the instruction for updating the priority, Therefore, the time is needed from the occurrence of the cyber-attack to the modification of the priority at the in-vehicle device. In a situation where the communication environment between the in-vehicle device and the server device is not at a desirable level, it is possible that the in-vehicle device may not receive the update instruction from the server device. In such a situation, the time may be consumed in collecting the log having a higher priority. Additionally, it is possible that the log required for analyzing the cyber-attack may be lost during a period from the in-vehicle device receiving the update instruction for modifying priority until the in-vehicle device updating the priority.

According to a first aspect of the present disclosure, a log collection system includes a log transmission controller and a server. The log transmission controller is equipped in a moving object. The log transmission controller includes a log acquirer, a priority storage, an update instruction acquirer, a priority updater and a transmitter. The log acquirer acquires a log indicating respective states of electronic control units connected to the log transmission controller. The priority storage stores priority information indicating a priority for transmitting the log to the server. The update instruction acquirer acquires a first update instruction, a second update instruction and a third update instruction. The first update instruction is generated by an update instructor equipped in the moving object for instructing to update the priority information stored in the priority storage. The second update instruction and the third update instruction are generated by the server for instructing to update the priority information. The priority updater updates the priority information based on the first update instruction, the second update instruction and the third update instruction. The transmitter transmits the log to the server based on the priority indicated by the updated priority information. The server is disposed at exterior of the moving object. The server includes a communicator, a log analyzer and a server-side instruction generator. The communicator receives the log transmitted from the transmitter. The communicator transmits the second update instruction and the third update instruction to the log transmission controller. The log analyzer analyzes the log received by the communicator and analyzes a security fault generated at the moving object. The server-side instruction generator generates the second update instruction and the third update instruction for instructing to update the priority information based on an analysis result of the log analyzer. The first update instruction and the second update instruction are instructions to update the priority indicated by the priority information to be higher than a predetermined priority, and the third update instruction is an instruction to update the priority indicated by the priority to the predetermined priority.

According to a second aspect of the present disclosure, a log transmission controller includes a log acquirer, a priority storage, an update instruction acquirer, a priority updater and a transmitter. The log acquirer acquires a log indicating respective states of electronic control units connected to the log transmission controller, which is equipped in a moving object. The priority storage stores priority information indicating a priority for transmitting the log to a server, which is disposed at exterior of the moving object. The update instruction acquirer acquires a first update instruction, which is an update instruction generated by an update instructor equipped in the moving object, for instructing to update the priority information stored in the priority storage, and a second update instruction and a third update instruction, which are respectively update instructions generated by the server, for instructing to update the priority information. The priority updater updates the priority information based on the update instruction. The transmitter transmits the log to the server based on the priority indicated by the updated priority information. The first update instruction and the second update instruction are instructions to update the priority indicated by the priority information to be higher than a predetermined priority, and the third update instruction is an instruction to update the priority indicated by the priority to the predetermined priority.

According to a third aspect of the present disclosure, a method for controlling log transmission is executed by a log transmission controller equipped in a moving object. The method includes: acquiring a log indicating respective states of electronic control units connected to the log transmission controller; storing priority information indicating a priority for transmitting the log to a server, which is disposed at exterior of the moving object; acquiring a first update instruction, which is an update instruction generated by an update instructor equipped in the moving object, for instructing to update the stored priority information, and a second update instruction and a third update instruction, which are respectively update instructions generated by the server, for instructing to update the priority information; updating the priority information based on the update instruction; and transmitting the log to the server based on the priority indicated by the updated priority information. The first update instruction and the second update instruction are instructions to update the priority indicated by the priority information to be higher than a predetermined priority, and the third update instruction is an instruction to update the priority indicated by the priority to the predetermined priority.

According to a fourth aspect of the present disclosure, a computer program product is stored on a non-transitory computer readable medium and including instructions, when executed by a processor in a log transmission controller equipped in a moving object, cause the processor to: acquire a log indicating respective states of a plurality of electronic control units connected to the log transmission controller; store priority information indicating a priority for transmitting the log to a server disposed at exterior of the moving object; acquire a first update instruction, which is an update instruction generated by an update instructor equipped in the moving object, for instructing to update the stored priority information, and a second update instruction and a third update instruction, which are respectively update instructions generated by the server, for instructing to update the priority information; update the priority information based on the update instruction; and transmit the log to the server based on the priority indicated by the updated priority information. The first update instruction and the second update instruction are instructions to update the priority indicated by the priority information to be higher than a predetermined priority, and the third update instruction is an instruction to update the priority indicated by the priority to the predetermined priority.

According to the above aspects of the present disclosure, it is possible that each of the log collection system, it is possible that each of the log collection system, the log transmission controller, the log transmission control method and the computer program product described in the present disclosure updates the priority to the default priority based on the update instruction for updating the priority of the log generated in the in-vehicle device and the server in a situation where the collection of the log through the server device is no longer needed. Hence, it is possible to prevent the unnecessary log to be stored in the in-vehicle device and prevent the unnecessary log to be transmitted to the server.

The difficulty described above is not a publicly known matter but is originally found by the inventors in the present application, and is a fact that confirms non-obviousness of the present application together with a configuration and a method described in the present application.

Embodiments of the present disclosure will be described below with reference to the drawings.

The following describes an example of a log collection system 1 commonly adopted in each of the embodiments with reference to FIG. 1. The log collection system 1 includes an electronic control system 10 equipped in an automobile and a server device 20 or a server device 30 disposed at exterior of the automobile. The server device 20 may be referred to as a first server device or a first server, and the server device 30 may be referred to as a second server device or a second server. The communication between the electronic control system 10 and the server devices 20, 30 is executed through a communication network 2. The following describes that the electronic control system included in the log collection system 1 corresponds to an in-vehicle system 10 equipped in the automobile in each of the embodiments. However, the electronic control system is not limited to the in-vehicle system.

For the communication network 2, a wireless communication may be used, such as IEEE802.11 (Wi-Fi: registered trademark), IEEE802.16 (WiMAX: registered trademark), W-CDMA (Wideband Code Division Multiple Access), HSPA (High Speed Packet Access), LTE (Long Term Evolution), LTE-A (Long Term Evolution Advanced), 4G, and 5G. DSRC (Dedicated Short Range Communication) may also be used. For the communication network 2, a wired communication may be used, such as wired LAN (Local Area Network), internet, and landline phone line.

Figure 2:
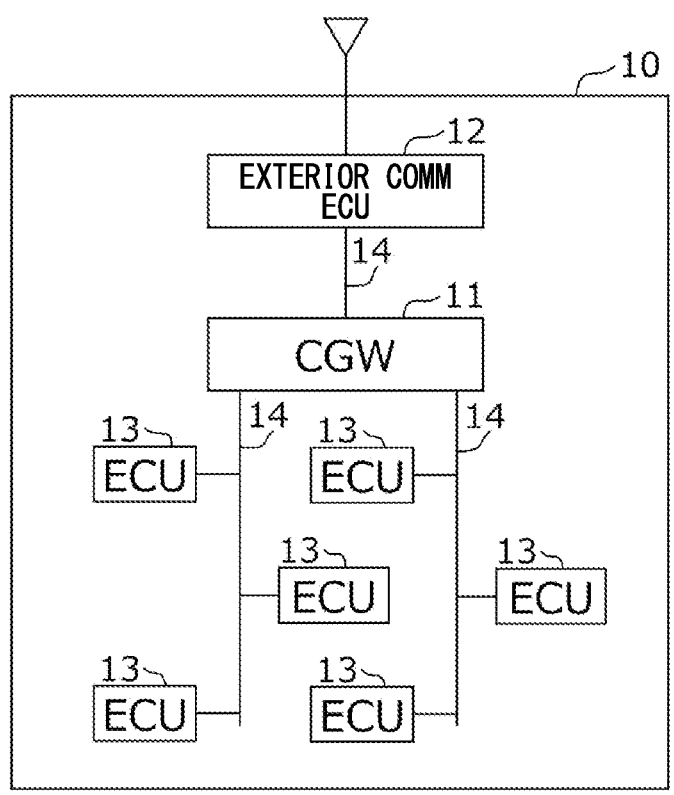
FIG. 2 is a block diagram that illustrates an example of the configuration of an in-vehicle device commonly adopted in each of embodiments.

The following describes the configuration of the in-vehicle system 10 with reference to FIG. 2. The in-vehicle system 10 includes a central gateway device 11 (hereinafter referred to as a CGW 11), an external communication electronic control unit 12 (hereinafter referred to as an external communication ECU 12), an electronic control unit 13 (hereinafter referred to as an ECU 13), and a network 14 for connecting, for example, the CGW 11, the external communication ECU 12 and the ECU 13.

The CGW 11 is an electronic control unit that relays communication between the external communication ECU 12 and the ECU 13 or between the ECUs 13 via the network 14.

The external communication ECU 12 is an electronic control unit that wirelessly communicates with the server devices 20 and 30 using the communication network 2.

The ECU 13 is an electronic control unit that implements respective functions. Any ECU may be used as the ECU 13. The electronic control unit (ECU) may be, for example, a drive system electronic control device that controls an engine, a steering wheel, a brake, etc. The ECU may be, for example, a vehicle-body electronic control device that controls a meter, and a power window, etc. The ECU may be, for example, an information-system electronic control device such as a navigation device. The ECU may be, for example, a safety-control electronic control device that controls to prevent a collision with an obstacle or a pedestrian.

The ECUs may be classified to have a master-slave relationship, rather than in parallel with each other. The ECUs may be classified into a master and a slave. Multiple ECUs 13 may be further provided under the particular ECU 13 through a sub-network. In this situation, the particular ECU 13 functions as a gateway device.

The network 14 connects the CGW 11, the external communication ECU 12 and the ECU 13. In FIG. 1, the network 14 is an in-vehicle network and may use such communication standards as, for example, CAN (Controller Area Network), LIN (Local Interconnect Network), Ethernet (registered trademark), Wi-Fi (registered trademark), and any other suitable communication standards.

First Embodiment

Figure 3:
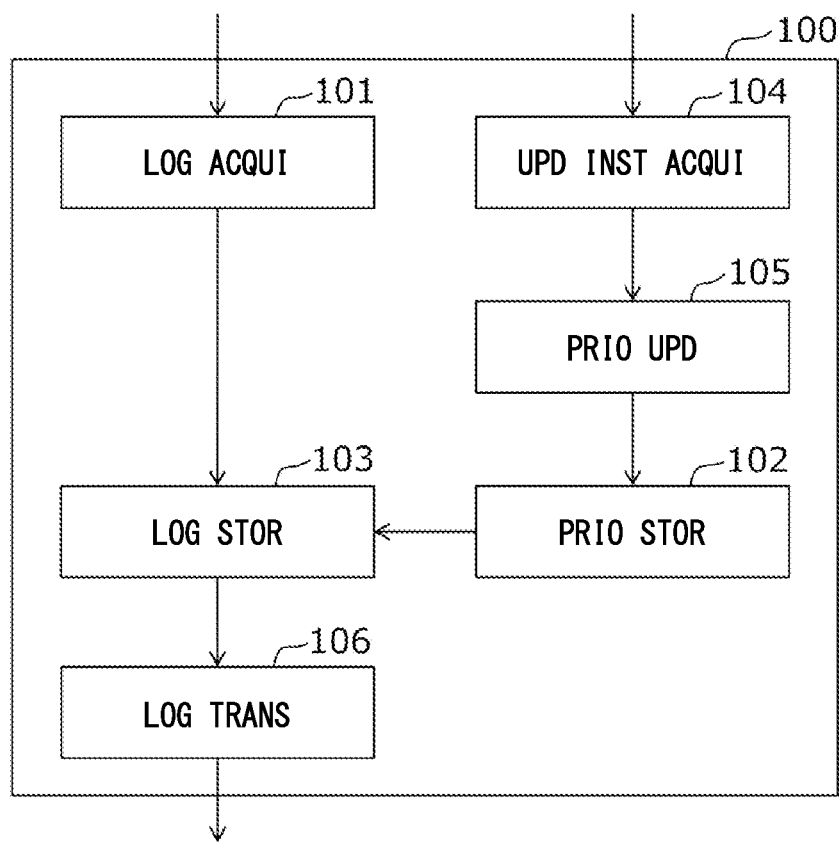
FIG. 3 is a block diagram that illustrates an example of the configuration of a log transmission controller according to first to third embodiments.

The following describes the configuration of the log transmission controller 100 according to a first embodiment with reference to FIG. 3. The log transmission controller 100 equipped in an automobile that is a "moving object". The log transmission controller 100 includes a log acquisition device 101, a priority storage 102, a log storage 103, an update instruction acquisition device 104, a priority update device 105, and a log transmitter 106. The log acquisition device 101 may also be referred to as a log acquirer, the update instruction acquisition device 104 may also be referred to as an update instruction acquirer, the priority update device 105 may also be referred to as a priority updater, and the log transmitter 106 may also be referred to as a transmitter.

The moving object may also be referred to as a moveable object, and the moving speed of the moving object is not particularly restricted. The moving object may stop. For example, the moving object includes, but is not limited to, vehicles, motorcycles, bicycles, pedestrians, ships, aircraft, and objects mounted on these examples.

In each of the following embodiments, the log transmission controller 100 is provided inside the CGW 11 as illustrated in FIG. 2. However, the installation of the log transmission controller 100 is not particularly restricted. For example, the log transmission controller 100 may be provided at any of positions connected to the network 14. For example, the log transmission controller 100 may be provided as an independent dedicated ECU, or may be provided for the ECU 13 having a sub-gateway function.

The log transmission controller 100 may be in the form of a component, a semi-finished product, or a finished product. In the present embodiment, the log transmission controller 100 is implemented by a semiconductor circuit in the CGW 12, and therefore the log transmission controller 100 in the present embodiment is in the form of a component.

Examples of the form of a component include a semiconductor module. Examples of the form of a semi-finished product include an independent electronic control unit (ECU). Examples of the form of a finished product include a server, a workstation, a personal computer (PC), a smart phone, a cell phone, and a navigation system. However, the security management device 100 is not limited to these examples.

The log transmission controller 100 may be composed of a general-purpose CPU (Central Processing Unit), a volatile memory such as RAM, a non-volatile memory such as ROM, flash memory, or hard disk, various interfaces, and an internal bus connecting them. Then, by executing software on these hardware, the log transmission controller 100 can be configured to execute the functions of each functional block described in FIG. 3.

The log acquisition device 101 acquires a log that indicates the state or status of the ECU 13 connected to the log transmission controller 100. The log acquisition device 101 corresponds to an acquisition device. The log for indicating the state of the ECU 13 (hereinafter referred to as a state log) is a log adopted for log analysis at the server device 20, For example, the log records resources such as input and output of data to the ECU 13 (for instance, the interval of inputting or outputting data, or the size of date being input or output), the CPU usage or the memory usage amount of the ECU 13. The state log may also record, for example, the function or version information of the ECU 13 or the type information of an automobile equipped with the log transmission controller 100. The state log may further include information such as time information or identification information of ECU in addition to the state of the ECU 13.

In the present disclosure, the log indicating the "state" is, for example, a log that records a constantly changing dynamic state such as the operation of the ECU, and a static state that essentially does not change such as the version or function of the ECU.

The priority storage 102 stores priority information indicating "priority" for transmitting a state log to the server device 20. Details of the priority information stored in the priority storage 102 is described hereinafter.

Here, the "priority" is an index determined based on a predetermined evaluation standard, and the expression method is arbitrary. For example, it may be represented by a symbol as well as a number. The number classified by the index may be plural, and may be finite or infinite.

The log storage 103 is a volatile or non-volatile memory, and stores the state log acquired by the log acquisition device 101. The state log stored in the log storage 103 is automatically deleted after the state log is transmitted from the log transmitter 106 for ensuring the storage capacity of the log storage 103. In a situation where the capacity of the state log reaches the storage capacity of the log storage 103, the state log having a lower priority, which is indicated by the priority information, among the state logs stored in the log storage 103 may be discarded in order. Even in a situation where the instruction for discarding a specified state log is received from the server device 20, the state log stored in the log storage 103 may also be discarded. It is assumed that the server device 20 provides an instruction to discard, for example, a state log which has been tampered by the cyber-attack or a state log that shows a faulty value caused by a fault.

The update instruction acquisition device 104 acquires an update instruction generated by an update instruction device 300 (may also be referred to as an update instructor) described hereinafter. This update instruction instructs updating the priority information stored in the priority storage 102, and includes the update content of the priority information. For example, the update instruction includes the type of state log whose priority should be updated, the updated value of the priority of each state log, and the validity period of the updated value of the priority.

The priority update device 105 updates the priority information stored in the priority storage 102, based on the update instruction acquired by the update instruction acquisition device 104.

The log transmitter 106 transmits the state log stored in the log storage 103 to the server device 20 based on the priority indicated by the priority information stored in the priority storage 102. In a situation where the priority information is updated by the priority update device 105, the log transmitter 106 may transmit the state log and the updated priority information to the server device 20.

The transmission of the log based on the priority may refer to a situation in which, by adopting the priority, the log with a higher priority is preferentially transmitted as compared with the log with a lower priority. For example, the logs are sequentially transmitted from the start of the log with higher priority, or the transmission frequency of the log with the higher priority is made to be higher than the transmission frequency of the log with the lower priority.

For example, in a situation where the log acquisition device 101 acquires the state log, the priority corresponding to the state log acquired from the priority information stored in the priority storage 102 is extracted, and the state log given by the extracted priority is stored in the log storage 103. Subsequently, the state log with a higher priority is output to the log transmitter 106 in order. As a result, the log transmitter 106 sequentially transmits the state log to the server device 20 from higher orders based on the priority.

Alternatively, the state log with the higher priority may be transmitted to the server device 20 in a higher frequency, and the state log with the lower priority may be transmitted to the server device 20 in a lower frequency.

Each of FIGS. 4A and 4B illustrates an example of the priority information stored in the priority storage 102. In FIGS. 4A and 4B, the type of state log transmitting to the server device 20, the priority of the state log, and the validity period of the priority are respectively stored as the priority information in the priority storage 102. The priority includes the newest priority and default priority. FIGS. 4A and 4B illustrate that the priority is represented by a numerical value of 1 to 15. The smaller numerical value indicates the higher priority. The validity period of the priority is the validity period of the newest priority.

The default priority is a value preliminarily set by, for example, a manufacturer of the CGW 13 or the in-vehicle system 10, or a dealer of automobile equipped with the in-vehicle system 10. The newest priority is a priority to be adopted in a situation where the state log is transmitted to the server device 20. The priority update device 105 updates the value of the newest priority to the value of priority instructed by the update instruction.

FIG. 4A indicates information stored as an initial state in the priority storage 102. Therefore, the newest priority is identical the default priority. The validity period of the newest priority has not been set. The newest priority identical to the default priority is adopted until the newest priority is updated by the update instruction. In FIG. 4A, it can be understood that the priority of each state log is any numeral value from 10 to 15, and the priority of each state log is not relatively high.

In a situation where the priority storage 102 stores the information as illustrated in FIG. 4A, the log transmitter 106 transmits each state log to the server device 20 based on the newest priority illustrated in FIG. 4A.

The lowest priority may indicate that the state log has not been transmitted. In a situation where the lowest priority indicates that the state log has not transmitted, the state log corresponding to this priority is not transmitted to the server device 20 until the priority information is updated.

On the other hand, FIG. 4B illustrates information stored in the priority storage 102 after the priority information is updated based on the update instruction. In FIG. 4B, the priority of each state log is any numeral values from 2 to 5, the newest priority is updated to a value different from the default priority. In FIG. 4B, it can be understood that the priority of each state log is updated to be higher than the default priority based on the update instruction. FIG. 4B is different from FIG. 4A such that the validity period is set in FIG. 4B. This indicates the validity period of the newest priority which has been updated, and also indicates that the newest priority is again updated to the default priority in a situation where the newest priority exceeds the validity period.

In a situation where the priority storage 102 stores the information as illustrated in FIG. 4B, the log transmitter 106 transmits each state log to the server device 20 based on the newest priority illustrated in FIG. 4B. In this example, since the version information log of the ECU-A and the priority of the version information of the ECU-B have the highest priority, the respective state logs of the version information log of the ECU-A and the priority of the version information of the ECU-B are transmitted to the server device 20 in order.

Figures 5, 6:
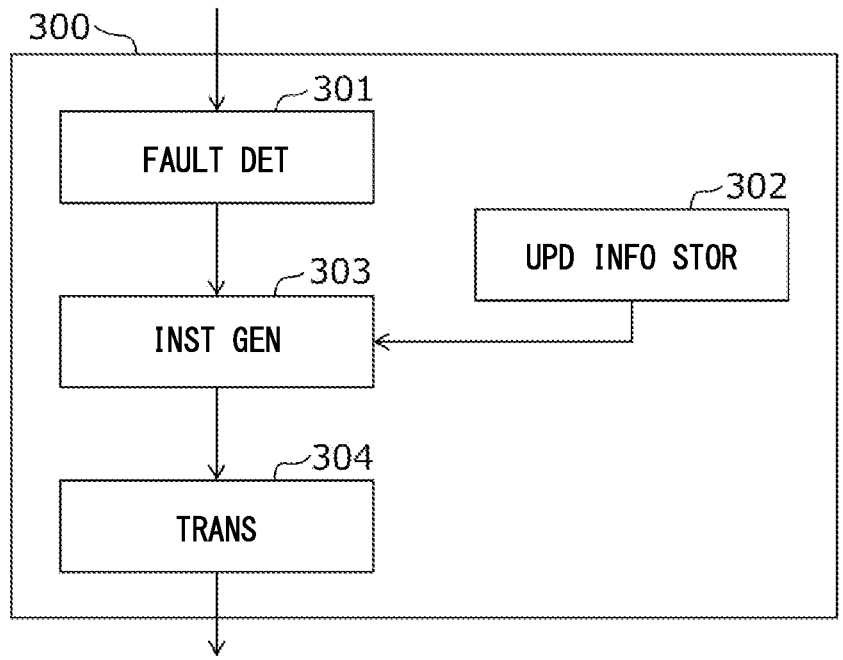
FIG. 5 is a block diagram that illustrates an example of the configuration of an update instruction device according to the first to third embodiments.
FIG. 6 illustrates information stored in a priority storage according to the first to third embodiments.

The following describes the configuration of the update instruction device 300 with reference to FIG. 5. The update instruction device 300 includes a fault detector 301, an update information storage 302, an instruction generator 303 and a transmitter 304. The update instruction device 300 described in the present disclosure may be composed of a general-purpose CPU (Central Processing Unit), a volatile memory such as RAM, a non-volatile memory such as ROM, flash memory, or hard disk, various interfaces, and an internal bus connecting them. Then, by executing software on these hardware, the update instruction device 300 can be configured to execute the functions of each functional block described in FIG. 5.

Similar to the log transmission controller 10, the update instruction device 300 is equipped in the automobile. In each of the following embodiments, the update instruction device 300 is provided at an external part of the log transmission controller 100, for example, the inner part of the ECU 13 in FIG. 2. In a situation where the update instruction device 300 is provided inside the ECU 13, the update instruction device 300 is disposed at a location closer to each function. Therefore, it is possible that the update instruction device 300 executes the fault detection and update instruction in a state where the time lag after the occurrence of the fault is short, and prevents a situation where the information required for analysis is lost. However, the location where the update instruction device 300 is disposed is not limited to the above description. The update instruction device 300 and the log transmission controller 100 may be provided at the CGW 11. The CGW 11 has a particularly high performance among the ECUS included in the in-vehicle system 10. Therefore, by providing the update instruction device 300 at the CGW 11, it is possible to prevent a situation where the load of the ECU 13 is enlarged. The ECU 13 has a lower performance than the CGW 11. It is possible that the CGW 11 monitors each network since the CGW 11 is connected to many in-vehicle networks 14.

The fault detector 301 detects a fault occurred at the ECU 13. The fault detector 301 detects a fault state by, for example, CFI (Control Flow Integrity), IDS (Intrusion Detection System), error checking such as SSL certificate error and transmission error, detection of communication to be filtered, and resource monitoring for detecting the fault occurred at the ECU 13. Alternatively, the fault detector 301 may detect the fault occurred at the ECU 13 by acquiring the information indicating that the fault has occurred from the fault detector (not shown) provided at the ECU 13 different from the update instruction device 300. Since it is possible that the fault detector 301 monitors the ECU 13 in real time and detects the fault, there is a high possibility that the fault can be detected without delay after receiving the cyber-attack.

The fault detector may find out the fault by itself to detect the fault. In addition, the fault may also be detected by acquiring the information indicating that the fault is found out by other devices.

The update information storage 302 stores the state log whose priority should be updated, the updated value of the priority and the validity period of the priority for each content of the fault which can be detected by the fault detector 301. Details of the information stored in the update information storage 302 is described hereinafter.

In a situation where the fault detector 301 detects the fault, the instruction generator 303 extracts information of the state log for which should be updated, the updated value of the priority and the validity period corresponding to the content of the detected fault from the update information storage 302 to generate the update instruction. In other words, the instruction generator 303 generates the update instruction for instructing the predetermined state log to be updated only the predetermined validity period for the priority corresponding to the content of the detected fault.

Herein, the content of the fault includes not only the type of fault, but also includes the degree of the fault, the location where the fault occurs, and the fact of the fault occurrence.

The transmitter 304 transmits the update instruction generated by the instruction generator 303 to the log transmission controller 100. The transmitter 304 may further provide the fault information indicating, for example, the type of fault detected by the fault detector 301 to the state log indicating the fault state and then transmit it to the log transmission controller 100.

FIG. 6 illustrates an example of the information stored in the update information storage 302. FIG. 6 illustrates that CFI fault of the ECU-A and a log fault of the CAN communication are listed as examples of the fault detected by the fault detector 301. In a situation where these faults are detected, the update information storage 302 further stores the type of the state logs whose priority should be updated, and the updated values of the priority and the validity periods of the respective state logs.

For example, in a situation where the fault detector 302 detects the CR fault of the ECU-A, the update instruction is generated for five state logs illustrated in FIG. 6 to update the priority information for the respective updated values of the priority.

As illustrated in FIG. 6, even in a situation where the fault detector 301 detects the fault of the ECU-A, the state log whose priority should be updated is not restricted to the state log of the ECU-A. For example, the update information storage 302 may also update the state log of the ECU existing at the path from the external communication ECU 12 to the ECU having the fault (for example, the ECU-A), in other words, the state log of the CGW 11 or the external communication ECU 12 as the state log whose priority should be updated, Since the ECU existing at the path from the external communication ECU 12 to the ECU having the fault is present at the path receiving the cyber-attack, it is possible that that the ECU may be influenced by the cyber-attack, Therefore, by updating the priority of the state log of the ECUs existing on such a path to higher priority and transmitting the updated priority to the server device 20, it is possible that the server device 20 can grasp the damage state of these ECUs, identify an attack route or identify the vulnerability of the ECUs. Similarly, in a situation where the fault detector 301 detects a fault in the log of the CAN communication, the state log of the ECU connected by the bus and the ECU having the fault or the state log of the ECU transmitting or receiving the log having an ID identical to the one of the log having the detected fault may be regarded as the state log whose priority should be updated.

Not only for the ECUs having the fault, but also for the priority of the state log of the ECU related to the ECUs having the fault, it may be desirable to store the priority in the update information storage 302 as the state log whose priority should be updated. As a result, it is possible that the server device 20 analyzes the possibility of the cyber-attack or the damage state caused by the cyber-attack in detail.

The type of state log whose priority should be updated, the updated value of the priority, and the validity period of the priority, which are stored in the update information storage 302, are set in view of, for example, the importance of the function of the ECU and the relationship between the ECUs. For example, as similar to the priority information to be stored in the priority storage 102, these values may be preliminary stored by, for example, a manufacturer or may be updated periodically by an instruction of the server device 20. It is generally considered that the time required to respond to the cyber-attack is about 1 week on average and about one month at the longest. Therefore, the validity period of the priority may be one week as a specified value.

The update information storage 302 may set different state log, updated values of priority and the validity periods of the priority according to the severity of the fault, even though the type of fault is identical. The severity of the fault may be set according to, for example, the level of the fault such as the difference between a threshold value and a value indicating the fault log or a location having an occurrence of the fault. In a situation where the transmitter 302 transmits the state log with the detected fault to the log transmission controller 100, the information of the type of fault or the severity of fault may be added to the state log and then transmitted to the log transmission controller 100. However, for example, the content of the fault stored in the update information storage 302 and the state log whose priority should be updated are not restricted to the example illustrated in FIG. 6.

In FIG. 6, the priority updated value for the CFI log of the ECU-A at a time of having the CFI fault in the ECU-A is 2, and the priority updated value for the CFI log of the ECU-A at a time of having the log fault in the CAN communication is 3. In an unlikely situation where the log fault in the CAN communication occurs after the occurrence of the CFI fault in the ECU-A, the priority corresponding to the CFI log of the ECU-A stored in the priority storage 102 of the log transmission controller is updated to "2" according to an initial instruction, and then is updated to "3" according to a subsequent instruction. Thus, the priority may be overwritten by a lower priority. Therefore, the priority update device 105 of the log transmission controller 100 may preliminarily set the priority indicated by the priority information updated based on the update instruction such that the priority is not to be overwritten by the lower priority.

Figure 7:
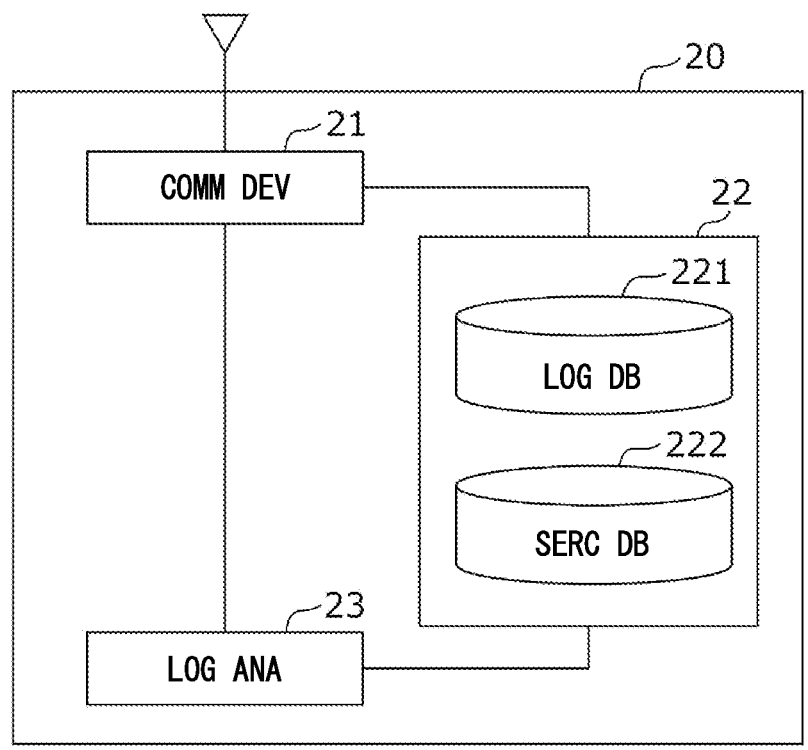
FIG. 7 is a block diagram that illustrates an example of the configuration of a server device according to the first embodiment.

The following describes the configuration of the server device with reference to FIG. 7. The server device 20 includes a communication device 21 (may also be referred to as a communicator), a database 22 and a log analyzer 23. The server device 20 described in the present disclosure may be composed of a general-purpose CPU (Central Processing Unit), a volatile memory such as RAM, a non-volatile memory such as ROM, flash memory, or hard disk, various interfaces, and an internal bus connecting them. Then, by executing software on these hardware, the server devices 20 can be configured to execute the functions of each functional block described in FIG. 7.

The communication device 21 executes communication with the in-vehicle system 10 through the communication network 2.

The database 22 is a database including a log database (hereinafter, log DB) 221 and a security database (hereinafter, security DB) 222. The log DB 221 collects and then stores the logs, which are transmitted from the in-vehicle system 10 and received by the communication device 21. The security DB 222 stores the analyzed results of the log analyzer 23 described hereinafter, or the information related to the past cyber-attacks and the vulnerability of the in-vehicle system 10.

The log analyzer 23 analyzes the log transmitted from the log transmitter 106 of the log transmission controller 100 to analyze, for example, security faults occurred at the vehicle, in other words, the details of the cyber-attack such as an attacker, an attacking route, a cause, an attack. The analysis method of the security fault executed by the log analyzer 23 is arbitrary. For example, the log analyzer 23 may adopt, for example, information of the security DB 222 to execute analysis. The analysis result of the log analyzer 23 may be fed back to the in-vehicle system 10, or may be output as a report to a security manager.

Figure 8:
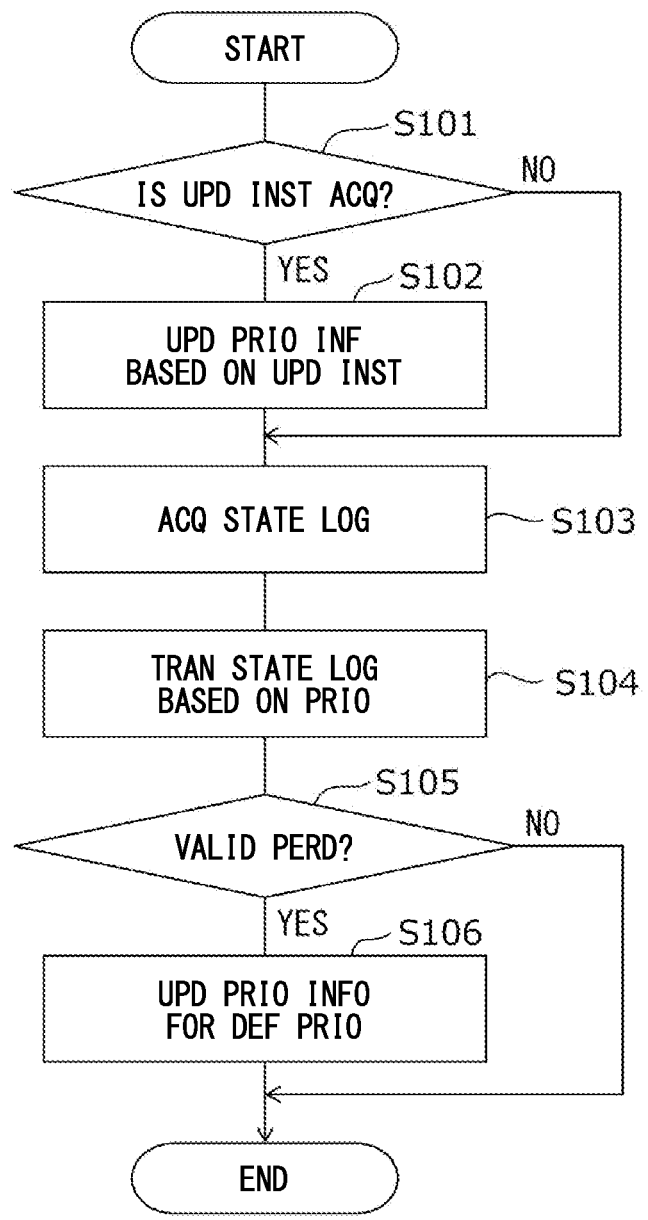
FIG. 8 is a flowchart that illustrates an operation of the log transmission controller according to the first to third embodiments.

The following describes an operation of the log transmission controller 100 with reference to FIG. 8, The following operation does not only indicate a log transmission control method by using the log transmission controller 100, but also indicates a procedure of a program executed by the log transmission controller 100. The order of the processes is not limited to the example shown in FIG. 8. That is, the order may be swapped as long as there is no restriction, such as a relationship where one step uses the result of the step before it. This applies not only to this embodiment but also to other embodiments.

In a situation where the update instruction acquisition device 104 acquires the update instruction in S101 (in other words, S101: YES), the priority information stored in the priority storage 102 is updated based on the update instruction in S102. In S103, the log acquisition device 101 acquires the state log transmitted by the ECU 13.

The state log acquired in S103 is transmitted to the server device 20 based on the priority indicated by the priority information stored in the priority storage 102. In a situation where the priority information is updated in S201, the state log is transmitted based on the priority indicated by the updated priority information.

The priority information updated in S102 is maintained until reaching the validity period of the priority stored in the priority storage 102. In a situation of reaching the validity period of the priority stored in the priority storage 102 (in other words, S105: YES), the priority update device 105 updates the value of the priority stored in the priority storage 102 to the default priority in S106.

As described above, according to the log transmission controller 100 in the present embodiment, the priority information of the state log is updated based on the update instruction from the update instruction device 300 equipped in the automobile. In the update instruction device 300 equipped in the automobile, since it is possible to detect the fault and generate the update instruction without a time lag after receiving the cyber-attack, the priority information of the state log stored in the priority storage 102 can be updated promptly.

(First Modification)

In the first embodiment, in a situation where the priority information is updated based on the update instruction, the log transmission controller 100 transmits the state log, which is acquired by the log acquisition device 101, to the server device 20 based on the updated priority information. The state log transmitted from the log transmission controller 100 to the server device 20 may be a state log stored in the log storage 103 prior to updating the priority information. The default priority before update is added to the state log stored in the log storage 103 prior to the priority update device 105 updating the priority information (corresponding to a pre-updated log). However, in a situation where the priority update device 105 updates the priority, the updated priority is again added to the state log stored in the log storage 103. Therefore, the state log stored in the log storage 103 is transmitted to the server device based on the priority indicated by the updated priority information.

Since the server device 20 executes the log analysis on both of the state log before the occurrence of the fault (in other words, the state log at the normal state) and the state log after the occurrence of the fault; it is possible to analyze the cyber-attacks in detail.

(Second Modification)

The first embodiment describes that the priority information is information that indicates a priority for the log transmission controller 100 to transmit the state log to the server device 20. However, the priority information may further indicate information for indicating the priority for storing the state log into the log storage 103 in addition to the priority for transmitting the state log to the server device 20.

In a situation where the validity period of the priority is set to be long, it is possible that the resource of the log transmission controller 100 is largely consumed since many state logs, which are not required for the server device 20 to analyze the cyber-attack, are transmitted from the log transmitter 106. However, in a situation where the validity period of the priority is set to be short, the priority of the state log required the analysis executed by the server device 20 is automatically updated to the default priority and may be erroneously discarded.

In the present modification, the priority for storing or accumulating the state log state log in the log storage 103, which is different from the priority for transmitting the state log to the server device 20; is set. In this situation, even though the validity period for transmitting the state log to the server device 20 has passed; and the order or frequency of transmitting the state log is lowered, it is possible to prevent the necessary state log from being discarded by setting the priority stored in the log storage 103 to a higher value. In a situation where the uploading of the specific state log is requested from the server device 20, it is possible to transmit the state log stored in the log storage 103 to the server device 20.

(Third Modification)

The above-mentioned embodiment describes that the update instruction device 300 generates the update instruction for updating the priority in a situation where the fault detector 301 detects a fault. However, the update instruction device 300 may generate the update instruction for updating the priority even though the fault has not been detected.

For example, the update instruction device 300 may generate the update instruction for updating the priority according to a vehicle state such as a traveling state, a stopped state, travelling on a specific road such as a highway. In this situation, the update instruction device 300 may generate the instruction for updating the priority to the default priority in addition to the instruction for updating the priority. For example, in a situation where the vehicle is travelling on the highway, the priority may be updated such that the priority of the specific state log is enhanced, and in a situation where the vehicle moves from the highway to a general road, the priority may be updated such that the priority of the log reaches the default priority.

Second Embodiment

In a second embodiment, the update instruction acquisition device 104 of the log transmission controller 100 acquires the update instruction generated by the update instruction device 300 and an update instruction generated by the server device, and updates the priority information based on these update instructions.

The configuration of the log transmission controller 100 and the configuration of the update instruction device 300 in the present embodiment are described with reference to FIGS. 3, 5.

Figure 9:
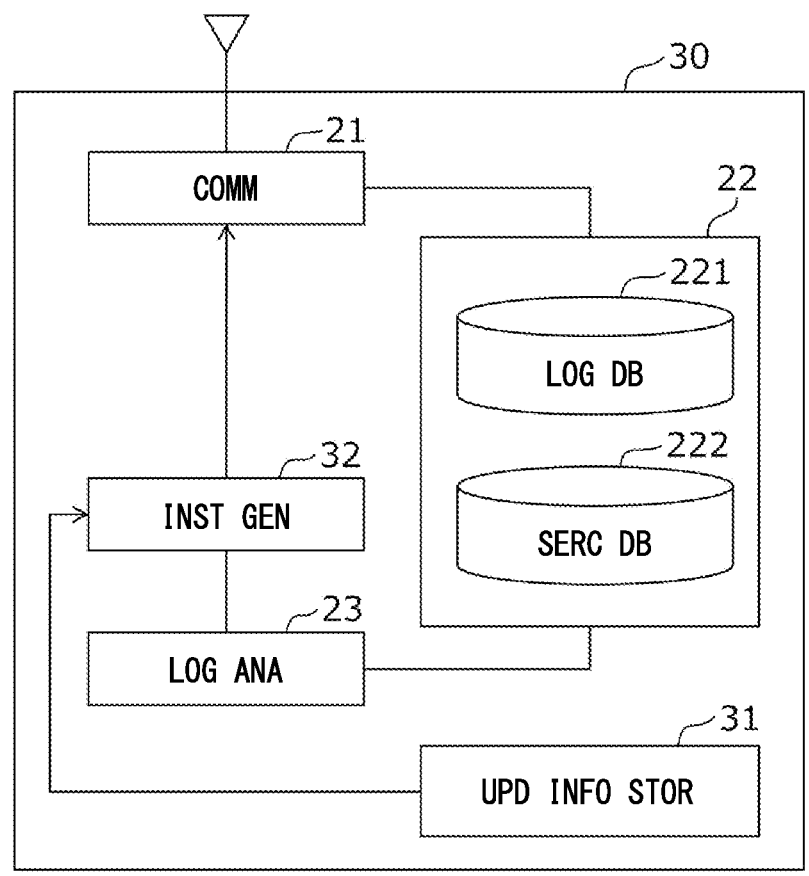
FIG. 9 is a block diagram that illustrates an example of the configuration of a server device according to the second embodiment.

FIG. 9 illustrates the configuration of the server device 30 in the present embodiment. The server device 30 includes an update information storage 31 and an instruction generator 32 in addition to each device included in the server device 20 according to the first embodiment. The update information storage 31 and the instruction generator 32 respectively have the functions identical to the functions of the update information storage 302 and the instruction generator 303 of the update instruction device 300 according to the first embodiment. In other words, the update information storage 31 stores the state log whose priority should be updated, the updated value of the priority and the validity period of the priority according to the analysis result of the log analyzed by the log analyzer 23 and the security fault occurred at the in-vehicle system of the vehicle. The instruction generator 32 (corresponding to a server-side instruction generator) generates an update instruction (corresponding to a second update instruction) for updating the priority information stored in the priority storage 102 of the log transmission controller 100 based on the analysis result of the security fault analyzed by the log analyzer 23. The server device 30 described in the present disclosure may be composed of a general-purpose CPU (Central Processing Unit), a volatile memory such as RAM, a non-volatile memory such as ROM, flash memory, or hard disk, various interfaces, and an internal bus connecting them. Then, by executing software on these hardware, the server devices 30 can be configured to execute the functions of each functional block described in FIG. 9.

Since the log analyzer 23 can adopt much information related to the cyber-attack stored in the security DB or abundant resources in the server device 30, it is possible to determine and then set the priority of the state log, which seems to be useful for analyzing the cyber-attacks in detail, with higher precision. Therefore, it may be desirable that the update information storage 31 of the server device 30 stores the update information classified by the update information storage 302 of the update instruction device 300 in detail. Alternatively, the server device 30 may include an update information determination device (not shown) that properly determines the updated value of the priority of an appropriate state log according to the analysis result of the log, in replacement of the update information storage 31. Alternatively, a user of the server device 30 may set the updated value of the priority manually based on the analysis result of the log analyzer 23. The server device 30 may set different state log, updated values of priority and the validity periods of the priority according to the severity of the fault, even though the type of fault is identical, as similar to the information stored in the update information storage 302.

The instruction generator 32 generates the update instruction for updating the priority information stored in the priority storage 102, and transmits the update instruction to the log transmission controller 100 through the communication device 21.

The update instruction acquisition device 104 of the log transmission controller 100 in the present embodiment acquires the update instruction (corresponding to a first update instruction) generated by the update instruction device 300 and the update instruction (corresponding to a second update instruction) generated by the instruction generator 32 of the server device 30.

The priority update device 105 updates the priority information based on the update instruction generated by the update instruction device 300 and the update instruction generated by the server device 30.

The operation of the log transmission controller 100 in the present embodiment is identical to the one described in the first embodiment. However, the update instruction acquired in S101 is either the update instruction generated by the update instruction device 300 or the update instruction generated by the server device 30.

The server device 30 analyzes the fault based on the state log transmitted from the in-vehicle system 10, and generates the update instruction for enhancing the priority of the state log required for analyzing further cyber-attack based on the analysis result. Therefore, it may take some time for the instruction generator 32 to generate the update instruction. In a situation where the update instruction generated by the instruction generator 32 is transmitted to the log transmission controller 100, it may take some time for the log transmission controller 100 to acquire the update instruction if the communication environment of the network 2 is not at a desirable level.

However, in the present embodiment, prior to acquiring the update instruction from the server device 30, it is possible to update the priority information of the state log based on the update instruction generated by the instruction generator 303 of the update instruction device 300. Therefore, even if the time lag happens for the log transmission controller 100 to acquire the update instruction from the server device 30 after the occurrence of the cyber-attack, it is possible to transmit the state log to the server device 30 by adopting the priority indicated by the priority information updated based on the update instruction from the update instruction device 300. As a result, it is possible to prevent the state log required for log analysis from being accidentally lost until acquiring the update instruction from the server device 30.

The update instruction in the present embodiment may also include information of instructor that indicates whether the instructor of the update instruction is the update instruction device 300 or the server device 30. In other words, the update instruction generated by the update instruction device 300 includes the information of instructor (corresponding to first instructor information) indicating the instructor for updating the priority is the update instruction device 300, and the update instruction generated by the server device 30 includes the information of instructor (corresponding to second instructor information) indicating the instructor for updating the priority is the server device 30. In this situation, the priority storage 102 stores the information of instructor in addition to each information illustrated in FIG. 4. The instructor may also be referred to as an instruction origin or an instruction source.

The update instruction generated by the server device 30 may further include information indicating that the priority information updated based on the update instruction generated by the server device 30 is not to be updated according to the update instruction generated by the update instruction device 300.

For example, it is possible that the update instruction device 300 detects a new fault and generates a new update instruction, after the priority information is updated based on the update instruction generated by the server device 30. In this situation, the priority information updated based on the update instruction generated by the server device 30 is again updated based on the new update instruction generated by the update instruction device 300, However, in a situation where the priority information is again updated before the state log required analyzing the fault previously occurred is transmitted to the server device 30, the server device 30 may not collect the state log sufficiently for analyzing the fault occurred previously. As the priority information based on the update instruction generated by the server device 30 includes the information indicating that the priority information is not to be updated according to the update instruction of the update instruction device 300, it is possible to prevent a situation where the priority information is again updated and overwritten based on the new update instruction generated by the new update instruction generated by the update instruction device. As the update instruction of the server device 30 includes information for enabling only the update through the update instruction of the server device 30, the update instruction of the server device 30 may indicate that the priority information is not to be updated according to the update instruction of the update instruction device 300.

In a situation where the update instruction includes the information of instructor, the information of instructor may indicate that the priority information is set not to be updated by the update instruction of the update instruction device 300. For example, the update instruction from the server device 30 includes the information of instructor (for example, the instructor ID: 0000) indicating that the priority information is set not to be updated by the update instruction of the update instruction device 300, or the information of instructor (for example, the instructor ID: 1111) indicating that the update of the priority information is enabled by the update instruction of the update instruction device 300. As the update instructions generated by the identical server device 30 includes different information of instructor, it is possible to indicate whether the priority information is updated or not by the update instruction of the update instruction device 300 without increasing the amount of information of the update instructions. It is necessary to specify in advance which of these information of instructor indicates whether or not the priority information is permitted to be updated by the update instruction of the update instruction device 300. Therefore, such information of instructor is information that indicates whether or not the priority information is permitted to be updated by the update instruction of the update instruction device 300.

FIGS. 10A, 10B illustrate an example of updating the priority information stored in the priority storage 102 according to the present embodiment, FIG. 10A illustrates information stored in the priority storage 102 as an initial state. FIG. 10B illustrates information stored in the priority storage 102 after the priority is updated based on the update instruction of the update instruction device 300. FIGS. 10A, 10B respectively correspond to FIGS. 4A, 4B. However, FIGS. 10A, 10B are different from FIGS. 4A, 4B such that FIGS. 10A, 10B include information of instructor and information of propriety of update through the update instruction device 300. Since FIG. 10A illustrates the default priority, the instructor is not specified. However, in a situation where the default priority is transmitted from the server device 30, the information of instructor may indicate the server device 30. Since FIG. 10B illustrates the updated information based on the update instruction of the update instruction device 300, RIG. 10B illustrates that the information of instructor is the update instruction device 300.

FIG. 10C illustrates information stored in the priority storage 102 after the priority information is updated based on the update instruction of the server device 30. In FIG. 10C, the newest priorities of the version information log of the ECU-A and the CFI log of ECU-A are different from the newest priorities in FIG. 10B. This indicates that the priority information has been updated based on the update instruction of the server device 30. Therefore, the information of instructor corresponding to these two state logs indicate that the instructor is the server device. Since the instructor of these two state logs is the server device, the information, which further indicates that whether or not the priority information can be updated by the update instruction device 300, is updated. FIG. 10C illustrates that the version information log of the ECU-A may be updated by the update instruction device 300, and the CFI log of the ECU-A is not updated by the update instruction of the update instruction device 300.

In the present embodiment, it may be desirable to transmit the updated priority information updated based on the update instruction from the update instruction device 300 to the server device 30. It is possible for the server device 30 to grasp the priority of the state log set in the log transmission controller 100 by transmitting the updated priority information to the server device 30. Therefore, the priority information is already updated by the update instruction from the update instruction device 300. In a situation where it is not necessary to update the priority information according to the update instruction from the server device 30, it is possible to exclude the unnecessary information from the update instruction and transmit the update instruction to the log transmission controller 100. Therefore, it is possible to suppress the amount of communication through the update instruction.

According to the present embodiment, the priority may be promptly updated by adopting a simple fault detection result in the update instruction device 300, and may be further updated by adopting a detailed analysis result of the log through the server device 30. Therefore, it is possible to determine the state log required for analyzing the cyber-attack with higher precision to set and update the proper priority, as compared with a situation where the priority is updated based on only the update instruction from the update instruction device 300. Since it is possible to update the priority promptly as compared with a situation where the priority is updated based on only the update instruction from the server device 30, it is possible to prevent the required log from being lost even in a situation where the update instruction for the priority from the server device 30 cannot be properly received due to a bad communication environment between the in-vehicle system 10 and the server device 30.

Third Embodiment

The above-mentioned embodiment describes a configuration for providing the validity period to the priority. In a situation of providing the validity period to the priority, since the priority is automatically updated to the default priority as the validity period has been elapsed, it is not possible to continue transmitting the state log to the server device while updating the priority of the state log to a higher value. However, in a situation where the validity period has been elapsed before the analysis executed by the server device is completed, it is possible that the server device cannot collect sufficient state logs required for analysis. Although it is possible to collect sufficient state logs by setting the validity period to be longer, in this situation, the resources of the log transmission controller may be overwhelmed through an increase in the storage or transmission amount of the state logs.

In the present embodiment, the update instruction acquisition device 104 of the log transmission controller 100 updates the priority back to the default priority based on the update instruction provided from the server device and deletes the state log whose priority is lower if necessary.

The configuration of the server device in the present embodiment is similar to the second embodiment and is described with reference to FIG. 9. In other words, the update information storage 31 of the server device 30 in the present embodiment stores the state log whose priority should be updated, the updated value of the priority and the validity period of the priority according to the analysis result of the log analyzed by the log analyzer 23 and the security fault occurred at the in-vehicle system of the vehicle. However, the update information storage 31 in the present embodiment does not store the validity period of the priority.

The instruction generator 32 generates the update instruction at least two times for updating the priority information stored in the priority storage 102 of the log transmission controller 100. Initially, the instruction generator 32 generates an update instruction (corresponding to a second update instruction) for enhancing the priority of the state log which seems to be beneficial to analyze the cyber-attack in detail, according to the result of a security fault generated in an in-vehicle system of the vehicle analyzed by the log analyzer 23.

It may be desirable that the log analyzer 23 collects and analyzes the state log, which is set to have a higher priority according to an initial update instruction; as a result, the response to the cyber-attack is completed. The completion of response to the cyber-attack refers to a situation where the countermeasure has been completed for eliminating the influence of the cyber-attack and eliminating the repeated identical cyber-attack. For example, the countermeasure may be the reprogramming of an ECU, which has vulnerability as the target of cyber-attack, through a wireless communication network. In such a situation, since it is not necessary for the server device 30 to collect the state log related to the cyber-attack, the instruction generator 32 generates the update instruction (corresponding to a third update instruction) for updating the priority back to the default priority. Hereinafter, the update instruction for updating the priority back to the default priority may also be referred to as a default update instruction.

Alternatively, instead of a situation at a time where the countermeasure to the cyber-attack is completed, the instruction generator 32 may generate the update instruction for updating priority back to the default priority in a situation where the detailed analysis of the cyber-attack is completed. In a situation where the analysis of the cyber-attack is completed and it is found that the influence of the cyber-attack is acceptable; or in a situation where the phase is shifted to the response phase for the cyber-attack, it can be determined that the collection of the state log with higher priority is not necessary, Therefore, in such a situation, the instruction generator 32 may generate the default update instruction at a timing where the analysis of the cyber-attack is completed. Alternatively, even in a situation where it is determined that the collection of the state log with higher priority is not necessary during the analysis, the instruction generator 32 may generate the default update instruction.

Herein, with regard to the timing at which the countermeasure to the cyber-attack is completed or the timing at which the analysis of the cyber-attack is completed, it may be assumed that the instruction generator 32 automatically determines the timing based on the analysis situation of the log analyzer 23 or based on whether the date for reprogramming is transmitted from the server device 30. However, the instruction generator 32 may generate the default update instruction, in a situation where a user of the server device 30 manually inputs that the countermeasure to the cyber-attack is completed or the analysis of the cyber-attack is completed or in a situation where the user of the server device 30 manually inputs the instruction for updating the priority back to the default priority.

In a situation where the instruction generator 32 generates the default update instruction, the update instruction may be an instruction for all of the state logs to return the priority to the default priority, or the update instruction may be an instruction for specifying a particular state log to return the priority to the default priority. The instruction for returning the priority to the default priority for all of the state logs may be simply processed through the management and communication of the priority information in the server device 30. On the other hand, in a situation of instructing only the specific state log to update the priority back to the default priority, it is possible to update only the priority of the state log which is not necessary for collection to the default priority after the completion of the countermeasure to the cyber-attack or the analysis of the cyber-attack. In a situation where only the specific state log is instructed to return the priority to the default priority, for example, an identification number preliminarily assigned to the state log is specified or the state log acquired by a specific sensor is specified to generate the default update instruction.

In a situation of generating the default update instruction, the instruction generator 32 may further generate the default update instruction to include the priority information, which is predicted or estimated to be stored in the priority storage 102 of the log transmission controller 100. In the following description, the priority information, which is predicted to be stored in the priority storage 102 by the instruction generator 32, may be referred to as predicted priority information. The priority information stored in the priority storage 102 should match the priority information updated based on the update instruction generated by the instruction generator 32 in the past. Therefore, the instruction generator 32 can predict that the updated priority information based on the update instruction generated in the past is the priority information stored in the priority storage 102.

The following describes the different parts of the configuration of the log transmission controller 100 and the configuration of the update instruction device 300 according to the present embodiment from the second embodiment with reference to FIGS. 3, 5.

As similar to the second embodiment, the update instruction acquisition device 104 of the log transmission control apparatus 100 in the present embodiment acquires the update instruction (corresponding to a first update instruction) generated by the update instruction device 300 and the update instruction (corresponding to a second update instruction), which is for enhancing the priority of the state log required for further analysis on the cyber-attack, generated by the instruction generator 32 of the server device 30. The update instruction acquisition device 104 according to the present embodiment further acquires the default update instruction for updating the priority of the state log back to the default priority through the external communication ECU 12. The default update instruction corresponds to a third update instruction.

In a situation where the update instruction acquisition device 104 acquires the default update instruction, the priority update device 105 updates the priority information stored in the priority storage 102 back to the default priority based on the default update instruction.

In a situation where the update instruction acquisition device 104 receives the default update instruction and the predicted priority information, the priority update device 105 compares the priority information stored in the priority storage 102 with the predicted priority information received by the update instruction acquisition device 104. In a situation where the predicted priority information matches the priority information stored in the priority storage 102 based on the comparison result, the priority of the state log based on the default update instruction is updated back to the default priority. On the other hand, in a situation where the predicted priority information is different from the priority information stored in the priority storage 102, the priority information is not updated based on the default update instruction. The priority information may be compared using, for example, a hash value.

The difference between the predicted priority information and the priority information stored in the priority storage 102 may be caused by a situation where the server device 30 transmits an update instruction for updating the priority information, and then the update instruction device 300 detects a new fault to generate a new update instruction and the priority information is further updated based on the new update instruction. In a situation where the priority is updated to the default priority based on the default update instruction, since the priority of the state log required for analyzing the fault newly occurred is updated to the default priority, the server device 30 may not collect the state log required for analysis.

Only in a situation where the predicted priority information matches the priority information stored in the priority storage 102, in other words, in a situation where the priority information is not updated based on the new update instruction, the priority update device 105 executes a process for returning the priority of the state log to the default priority. Therefore, it is possible to prevent a situation where the priority information updated based on the new update instruction generated by the update instruction device 300 is overwritten based on the default update instruction.

In this configuration, it may be desirable that the log transmission controller 100 transmits the information, which indicates that the priority information is updated based on the default update instruction, to the server device 30. The information, which is sent to the server device 30, indicates that the predicted priority information matches to the priority information stored in the priority storage 102 and that the log transmission controller 100 completes the update of the priority to the default priority based on a successful update. Therefore, the server device 30 can determine that the priority indicated by the priority information stored in the priority storage 102 is the default priority.

It is noted that the information, which may be sent to the server device 30, indicates that the predicted priority information is different from the priority information stored in the priority storage 102 and that the log transmission controller 100 fails to update the priority to the default priority based on a failed update. Therefore, the server device 30 can determine that the priority indicated by the priority information stored in the priority storage 102 is different from the priority managed by the server device 30.

As the priority is updated to the default priority, since the priority of the state log is updated to be lower, the transmission order of the state log to the server device 30 is later than other state logs or the transmission frequency of the state log is lowered. In a situation where the state log with such a lower priority is stored in the log storage 103, the resource of the log storage 103 is consumed, and the state log with a higher priority may not be stored in the log storage 103. In a situation where the storage capacity of the log storage 103 is reached, it may be desirable to delete the state logs from a lower priority in order. Since the default priority is set to a lower value, in the present embodiment, the state log given by the default priority is deleted from the log storage 103 in order. The storage amount of the log storage 103 may not necessarily be the storable capacity of the log storage 103, it may be the upper limit value of the storage capacity preliminarily set.

Alternatively, the priority update device 105 may discard the log with a lower priority among logs stored in the log storage 103 at a timing where the priority indicated by the priority information is updated to the default priority.

In a situation where multiple default priorities are set as the default priority, the server device 30 may instruct which of the default priorities is used for update, or the log transmission controller 100 may determine which of the default priorities is used for update according to the state of the vehicle.

Figure 11:
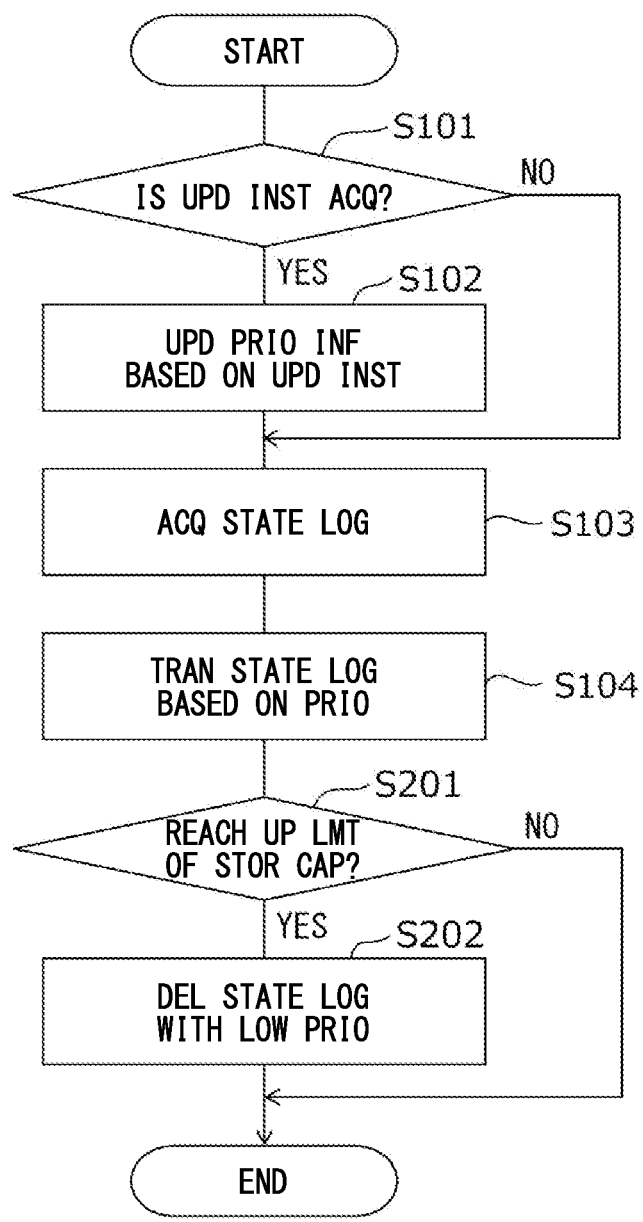
FIG. 11 illustrates a flowchart for explaining the operation of a log transmission controller according to the third embodiment.

The following describes the operation of the log transmission controller 100 according to the present embodiment with reference to FIG. 11. The same processes as those in FIG. 8 are designated by the same reference numerals, and the description thereof will be omitted.

In S101, the update instruction acquisition device 104 acquires the update instruction. The update instruction acquired in S101 according to the present embodiment is one of the update instruction generated by the update instruction device 300, the update instruction generated by the server device 30 for enhancing the priority, and the default update instruction for instructing the priority to return to the default priority.

In S201, in a situation of reaching the upper limit of the storage capacity of the log storage 103 (S201: YES), the state log with lower priority are deleted in order in S202. In a situation where there is a margin or space in the storage capacity in the log storage 103 (S201: NO), the process is terminated.

As described above, according to the present embodiment, the priority information stored in the priority storage 102 of the log transmission controller 100 is updated back to the default priority based on the update instruction provided from the server device 30, Since it is possible to lower the priority of the state log at a time point where the server device 30 no longer needs the state log, the resource of the log transmission controller 100 may be effectively utilized by preventing the unnecessary state log being stored in the log storage 103 and being transmitted to the server device 30. Furthermore, it is possible to prevent the state log required for the server device 30 to analyze the cyber-attack from being erroneously discarded.

The third embodiment has been described based on the assumption that the validity period of the priority is not provided. However, as in the other embodiments, the validity period of the priority may also be provided in the present embodiment. In this situation, it may be desirable to set a sufficiently longer for the server device to collect the necessary state log. As a result, even if the communication status between the in-vehicle system 10 and the server device 30 is poor and the update instruction for returning the priority to the default priority cannot be transmitted or received, the state of the high priority value continues. It is possible to prevent the log transmission control device 100 from continuously consuming the resources.

As similar to the second embodiment, the third embodiment has been described based on the assumption that the instruction generator 32 of the server device 30 generates the update instruction to update the priority of the state log required for further analysis on the cyber-attack such that the priority of the state log is enhanced. However, the instruction generator 32 may generate only the default update instruction. In this situation, the server device 30 can predict or estimate the priority information stored in the priority storage 102 by receiving the priority information, which is updated based on the update instruction generated by the update instruction device 300, from the log transmission controller 100.

The features of the log transmission controller and the like according to each embodiment of the present disclosure have been described above.

Terms used in the description of each embodiment are examples and may be replaced with synonymous terms or terms having a synonymous function.

The block diagram used in the description of each embodiment is a diagram in which the configurations of devices and the like are classified and organized by function. An individual function of the functional blocks may be implemented by (i) hardware alone (i.e., by using hardware circuitry including digital and/or analog circuits without CPU), or (ii) software alone (i.e., by using CPU along with memory storing program instructions), or (iii) any combination of the hardware and the software. Further, since the block diagram illustrates the functions, the block diagram can be understood as disclosure of the method and the program that implements the method.

Order of functional blocks that can be grasped as processing, a sequence, and a method described in relation to each embodiment may be changed unless some restriction is imposed, for example, a result from one step is utilized at another step.

The terms "first", "second", or "N" (N is an integer) used in each embodiment and the present disclosure are used to distinguish two or more configurations and methods of the same type, it does not limit the order or superiority.

In the above-described embodiments, the system is mounted on the vehicle. However, the present disclosure may be used for the system for special devices or general purpose devices other than vehicles.

In the above-described embodiment, the apparatus disclosed in each of the embodiments mounts on a vehicle. However, the apparatus may be carried by a pedestrian.

Further, examples of the log transmission controller described in the present disclosure include the following. Examples of the security management device according to the present disclosure include a semiconductor device, an electronic circuit, a module, and a microcontroller. Example of the security management device according to the present disclosure include an electronic control unit (ECU) and a system board, Example of the security management device according to the present disclosure include a mobile phone, a smartphone, a tablet, a personal computer (PC), a workstation, and a server. Further, the security management device may be a device having a communication function such as a video camera, a still camera, a car navigation system.

In addition, necessary functions such as an antenna and a communication interface may be added to the log transmission controller.

The present disclosure is implemented not only by dedicated hardware having a configuration and a function described in relation to each embodiment. The present disclosure can also be implemented as a combination of a program for implementing the present disclosure, recorded on such a recording medium as memory and a hard disk and general-purpose hardware including dedicated or general-purpose CPU, memory, or the like, capable of executing the program.

A program may be stored in a non-transitory tangible storage medium including an external storage (for example, hard disk, USB memory, CD/BD), or an internal storage (for example, RAM, ROM) in a special-purpose or general-purpose hardware (for example, computer). Such a program may be downloaded to the storage medium in the hardware via a communication link from a server. As a result, it is possible to provide a latest function by updating the program.

Although the log transmission controller described in the present disclosure is an electronic control unit equipped in the automobile, the log transmission controller may be an electronic control unit which is not equipped in the automobile.

Here, the flowchart described in this application or the process of the flowchart is composed of a plurality of sections (or referred to as steps), and each section is expressed as, for example, S101. Each section may be divided into several subsections, while several sections may be combined into one section. Furthermore, each section thus configured may be referred to as a device, module, or means.

Any effects described in the above embodiments are effects attained by a configuration of an embodiment as an example of this disclosure, and are not necessarily effects of this disclosure.

In the present disclosure, the configuration disclosed in each embodiment is not limited to each embodiment alone, but may be combined across the embodiments. For example, the configuration disclosed in one embodiment may be combined with another embodiment. Further, the disclosed configurations may be collected and combined in each of multiple embodiments.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A log collection system comprising:
   a log transmission controller configured to be equipped in a moving object; and
   a server configured to be disposed at exterior of the moving object,
   wherein the log transmission controller includes:
      a log acquirer configured to acquire a log indicating respective states of a plurality of electronic control units connected to the log transmission controller;
      a priority storage configured to store priority information indicating a priority for transmitting the log to the server;
      an update instruction acquirer configured to acquire
         a first update instruction, which is an update instruction generated by an update instructor configured to be equipped in the moving object, for instructing to update the priority information stored in the priority storage,
         a second update instruction, which is an update instruction generated by the server, for instructing to update the priority information, and
         a third update instruction, which is an update instruction generated by the server, for instructing to update the priority information;
      a priority updater configured to update the priority information based on the first update instruction, the second update instruction, and the third update instruction; and
      a transmitter configured to transmit the log to the server based on a priority indicated by the priority information that is updated, and
   wherein the server includes:
      a communicator configured to receive the log transmitted from the transmitter;
      a log analyzer configured to analyze the log received by the communicator and analyze a security fault generated at the moving object; and
      a server-side instruction generator configured to generate the second update instruction and the third update instruction for instructing to update the priority information based on an analysis result of the log analyzer,
   wherein the communicator is further configured to transmit the second update instruction and the third instruction to the log transmission controller,
   wherein the first update instruction and the second update instruction are instructions to update the priority indicated by the priority information to be higher than a predetermined priority, and
   wherein the third update instruction is an instruction to update the priority indicated by the priority to the predetermined priority.

2. A log transmission controller comprising:
   a log acquirer configured to acquire a log indicating respective states of a plurality of electronic control units connected to the log transmission controller, which is configured to be equipped in a moving object;
   a priority storage configured to store priority information indicating a priority for transmitting the log to a server, which is configured to be disposed at exterior of the moving object;
   an update instruction acquirer configured to acquire
      a first update instruction, which is an update instruction generated by an update instructor configured to be equipped in the moving object, for instructing to update the priority information stored in the priority storage,
      a second update instruction, which is an update instruction generated by the server, for instructing to update the priority information, and
      a third update instruction, which is an update instruction generated by the server, for instructing to update the priority information;
   a priority updater configured to update the priority information based on the update instruction; and
   a transmitter configured to transmit the log to the server based on a priority indicated by the priority information that is updated,
   wherein the first update instruction and the second update instruction are instructions to update the priority indicated by the priority information to be higher than a predetermined priority, and
   wherein the third update instruction is an instruction to update the priority indicated by the priority to the predetermined priority.

3. The log transmission controller according to claim 2, wherein the update instruction acquirer is configured to acquire the third update instruction and predicted priority information, which is predicted as the priority information stored in the priority storage by the server, and
   wherein the priority updater is further configured to:
      update the priority information based on the third update instruction, based on a condition that the predicted priority information matches the priority information stored in the priority storage; and
not to update the priority information based on the third update instruction, based on a condition that the predicted priority information is different from the priority information stored in the priority storage.

4. The log transmission controller according to claim 3, wherein the transmitter is further configured to transmit information, which indicates that the priority information is updated based on the third update instruction, to the server.

5. The log transmission controller according to claim 2, further comprising:
a log storage configured to store the log acquired by the log acquirer,
wherein the log includes a plurality of logs, and
wherein the priority updater is further configured to discard a log whose priority is lower among the logs stored in the log storage, in response to that the priority updater updates the priority indicated by the priority information to the predetermined priority.

6. The log transmission controller according to claim 2, further comprising:
a log storage configured to store the log acquired by the log acquirer,
wherein the log includes a plurality of logs, and
wherein the logs stored in the log storage are discarded in order from a log whose priority indicated by the priority information is lower among the logs.

7. The log transmission controller according to claim 2, wherein the log acquired by the log acquirer includes a plurality of logs, and
wherein the transmitter is further configured to transmit the logs in order from a log whose priority is higher among the logs.

8. The log transmission controller according to claim 2, wherein the log acquired by the log acquirer includes a plurality of logs, and
wherein the transmitter is further configured to transmit the log whose priority is higher among the logs in a higher frequency.

9. The log transmission controller according to claim 2, wherein the priority information includes a validity period of the priority, and
wherein the priority updater is further configured to update the priority to the predetermined priority, in response to that the validity period has been elapsed.

10. The log transmission controller according to claim 2, wherein the priority updater is further to update the priority information of the log for one or more of the electronic control units, which are disposed at a path leading to one of the electronic units having a fault, based on the update instruction.

11. The log transmission controller according to claim 2, further comprising:
a log storage configured to store the log acquired by the log acquirer,
wherein the priority information includes priority for storing the log in the log acquirer.

12. The log transmission controller according to claim 2, wherein the priority information includes information, which indicates that the priority is not updated based on the first update instruction, and
wherein the priority updater is further configured not to update the priority information based on the first update instruction, based on a condition that the priority information includes the information.

13. A method for controlling log transmission executed by a log transmission controller, the method comprising:
acquiring a log indicating respective states of a plurality of electronic control units connected to the log transmission controller, which is configured to be equipped in a moving object;
storing priority information indicating a priority for transmitting the log to a server, which is configured to be disposed at exterior of the moving object;
acquiring
a first update instruction, which is an update instruction generated by an update instructor configured to be equipped in the moving object, for instructing to update the priority information that is stored,
a second update instruction, which is an update instruction generated by the server, for instructing to update the priority information, and
a third update instruction, which is an update instruction generated by the server, for instructing to update the priority information;
updating the priority information based on the update instruction; and
transmitting the log to the server based on a priority indicated by the priority information that is updated,
wherein the first update instruction and the second update instruction are instructions to update the priority indicated by the priority information to be higher than a predetermined priority, and
wherein the third update instruction is an instruction to update the priority indicated by the priority to the predetermined priority.

14. A computer program product stored on a non-transitory computer readable medium and comprising instructions configured to, when executed by a processor in a log transmission controller, cause the processor to:
acquire a log indicating respective states of a plurality of electronic control units connected to the log transmission controller, which is configured to be equipped in a moving object;
store priority information indicating a priority for transmitting the log to a server, which is configured to be disposed at exterior of the moving object;
acquire
a first update instruction, which is an update instruction generated by an update instructor configured to be equipped in the moving object, for instructing to update the priority information stored that is stored,
a second update instruction, which is an update instruction generated by the server, for instructing to update the priority information, and
a third update instruction, which is an update instruction generated by the server, for instructing to update the priority information;
update the priority information based on the update instruction; and
transmit the log to the server based on a priority indicated by the priority information that is updated,
wherein the first update instruction and the second update instruction are instructions to update the priority indicated by the priority information to be higher than a predetermined priority, and
wherein the third update instruction is an instruction to update the priority indicated by the priority to the predetermined priority.

15. A log collection system comprising:
a log transmission controller configured to be equipped in a moving object; and a server configured to be disposed at exterior of the moving object, wherein the log transmission controller includes a first processor and a first memory that stores instructions configured to, when executed by the first processor, cause the first processor to:
  acquire a log indicating respective states of a plurality of electronic control units connected to the log transmission controller;
  store priority information indicating a priority for transmitting the log to the server;
  acquire
    a first update instruction, which is an update instruction generated by an update instructor configured to be equipped in the moving object, for instructing to update the priority information that is stored,
    a second update instruction, which is an update instruction generated by the server, for instructing to update the priority information, and
    a third update instruction, which is an update instruction generated by the server, for instructing to update the priority information;
  update the priority information based on the first update instruction, the second update instruction, and the third update instruction; and
  transmit the log to the server based on a priority indicated by the priority information that is updated, and wherein the server includes a second processor and a second memory that stores instructions configured to, when executed by the second processor, cause the second processor to:
  receive the log transmitted from the transmitter;
  analyze the log received by the server and analyze a security fault generated at the moving object;
  generate the second update instruction and the third update instruction for instructing to update the priority information based on an analysis result of the log; and
  transmit the second update instruction and the third update instruction to the log transmission controller, wherein the first update instruction and the second update instruction are instructions to update the priority indicated by the priority information to be higher than a predetermined priority, and wherein the third update instruction is an instruction to update the priority indicated by the priority to the predetermined priority.

16. A log transmission controller comprising:
a processor and a memory that stores instructions configured to, when executed by the processor, cause the processor to:
  acquire a log indicating respective states of a plurality of electronic control units connected to the log transmission controller, which is configured to be equipped in a moving object;
  store priority information indicating a priority for transmitting the log to a server, which is configured to be disposed at exterior of the moving object;
  acquire
    a first update instruction, which is an update instruction generated by an update instructor configured to be equipped in the moving object, for instructing to update the priority information that is stored,
    a second update instruction, which is an update instruction generated by the server, for instructing to update the priority information, and
    a third update instruction, which is an update instruction generated by the server, for instructing to update the priority information;
  update the priority information based on the update instruction; and
  transmit the log to the server based on a priority indicated by the priority information that is updated, wherein the first update instruction and the second update instruction are instructions to update the priority indicated by the priority information to be higher than a predetermined priority, and wherein the third update instruction is an instruction to update the priority indicated by the priority to the predetermined priority.

* * * * *